UNITED STATES PATENT OFFICE.

FRANZ NIEMANN, OF BASLE, SWITZERLAND.

PROCESS OF PREPARING REMEDIAL SERUM.

SPECIFICATION forming part of Letters Patent No. 651,951, dated June 19, 1900.

Application filed March 20, 1896. Serial No. 584,023. (No specimens.)

*To all whom it may concern:*

Be it known that I, FRANZ NIEMANN, of Basle, Switzerland, have invented certain new and useful Improvements in the Manufacture of Remedial Serum, of which the following is a specification.

This invention has reference to the manufacture of remedial serum, and more particularly of serum for the cure or retardation of the progress of tuberculosis.

Since the discovery of tuberculin by Koch frequent attempts have been made to prepare a tuberculin-antitoxine for remedial purposes. Among the earlier attempts injections of pure living cultivations of tubercle bacilli were made into horses and other animals and blood drawn from the tuberculous animals after several weeks. The serum separated from this blood was stated to possess a slight specific antitoxic action on tuberculous subjects; but the animal serving for the preparation of the serum almost invariably died before any considerable quantity of antitoxine was elaborated in its system, and consequently experiments in this direction were too few for any definite result to be arrived at. In place of tubercle bacilli injections were then tried of tuberculin, which is a sterilized glycerine extract of pure cultures of the tubercle bacillus. Boinet and E. Managliano have stated that it is possible by repeated injections with tuberculin, of which no quantities are given, to obtain a serum from the inoculated animal capable of exerting a remedial effect on tuberculous subjects. It appears, however, from their reports that only a brief temporary delay in the progress of the disease was afforded by the use of this serum, and Managliano himself admits that its injection is objectionable in advanced stages of consumption or where the infected area is extensive, while Boinet states that the treatment is of no avail in the advanced disease associated with excavation and is injurious even in tuberculosis of acute stage. The employment of tuberculin alone for injection, therefore, appears as futile as the employment of tubercle bacilli in the manufacture of antitoxic serum of remedial value.

After careful consideration of the probable causes of failure and studying the disadvantages, both practical and theoretical, of the above methods I succeeded after many trials in discovering a procedure different from the foregoing which enables tuberculous remedial serum to be prepared of high antitoxic value. Especially was I led to my conclusions by the consideration that glycerine is a blood poison, and when introduced into the circulation partially dissolves or shrivels up the red corpuscles and causes disturbances and stoppages in the blood-vessels, especially in the neighborhood of the pulmonary organs, which set up conditions promoting parenchymatous change. It therefore appeared to me that only very small quantities of tuberculin could be injected without running the risk of developing deleterious by-effects from glycerine poisoning.

For the preparation of remedial serum according to the new method it is preferred to employ one to two year old goats, though other animals—such as horses, asses, mules, &c.—may be employed should it be found impracticable to manufacture sufficient quantities of serum from the smaller animals. In the following directions for effecting immunity the quantities therefore only refer to healthy goats twenty-four kilos in weight; but the proportions of materials used to the animal weight remain substantially identical when larger or smaller animals are employed. The healthiness of the animal should first be ascertained by keeping it under close observation for about four weeks prior to the commencement of the treatment, during which period the weight of the animal should not decrease, but rather increase.

In carrying out this invention the treatment to which I subject the animals in order to procure the desired degree of immunity and the elaboration of a sufficient quantity of tuberculin-antitoxine in their systems to render the preparation of my remedial serum possible should be effected in three distinct stages, which I term the "preliminary" treatment, the "special" treatment, and the "final" treatment, respectively.

*Preliminary treatment.*—A subcutaneous injection of two cubic centimeters tuberculin is made, preferably, in the neck of the animal by means of a sterilized Pravatz syringe or other suitable instrument. The tuberculin which I employ for this purpose is preferably made in the following manner: A pure cultivation of tubercle bacilli from tuberculous human organs is made in glycerine-goat-blood serum, and then a sterilized bouillon containing twelve grams peptone, six grams sodium chloride, fifteen grams glycerine, and one hundred cubic centimeters sterilized goat-blood serum per one thousand cubic centimeters is inoculated therewith. The inoculated bouillon is then kept in an incubator for eight weeks at 41° centigrade. If at the end of that period a thick crust of tubercle bacilli has formed upon the surface of the bouillon and microscopical examination reveals the complete purity of the cultivation, the culture is sterilized by heating for two hours at 100° centigrade and then concentrated to one-tenth of its bulk filtered through a Chamberland filter and the filtrate evaporated to one-half. The dark yellow thick liquid so obtained is the tuberculin employed in the preliminary treatment. After the first injection of two cubic centimeters of this tuberculin there is usually a rise in temperature in goats of 1° to 1½° centigrade. After forty-eight hours a second injection of four cubic centimeters tuberculin is made, and if there is no subsequent rise in temperature within twenty-four hours at the end of forty-eight hours after the second injection a third injection of four cubic centimeters tuberculin is made. If, on the other hand, a reaction occurs after twenty-four hours, the third injection is unnecessary. The preliminary treatment is now complete, and I proceed (after an interval of about eight to ten days) to the special treatment, for which I employ the precipitated active compound or principle of tuberculin in order to avoid the danger of (more particularly) glycerine poisoning.

*Special treatment.*—The active principle of tuberculin for injection at this stage is prepared free from glycerine, preferably in the following manner: Five hundred cubic centimeters tuberculin is heated to 80° centigrade, then introduced into a high cylindrical vessel of about fifteen hundred cubic centimeters capacity and seven hundred cubic centimeters ninety-per-cent. alcohol, containing 0.8 per cent. carbolic acid, added, constantly stirring. A light voluminous precipitate is formed almost immediately, which is induced to deposit itself by centrifugating for a quarter of an hour. The supernatant liquid is then poured off from the dark brown deposit and the latter digested for twelve hours at 40° centigrade with sixty-per-cent. alcohol, containing 1.5 per cent. ammonium sulphate in solution. To insure complete precipitation, it is then allowed to stand a further twelve hours at ordinary temperature, whereupon the alcohol is carefully poured off and the precipitate brought upon a filter, where it is washed with a mixture consisting of three parts ethyl alcohol, one part benzene, one part chloroform, and 0.5 part amyl alcohol and finally dried in an exsiccator over sulfuric acid. The preparation thus obtained consists of a yellowish white powder which dissolves fairly easily in water. Seven milligrams of this preparation equal one cubic centimeter tuberculin in activity. As it commences to decompose after six to eight days when dissolved in water, only the quantity required for immediate use should be dissolved at one time.

The animal already subjected to the preliminary treatment receives in aqueous solution fifteen milligrams of the preparation as a first injection and twenty-five milligrams as a second, which is injected after forty-eight hours if no rise in temperature has meanwhile taken place. If a rise in temperature takes place, at least twenty-four hours must be allowed to lapse after the temperature has fallen before further treatment is proceeded with. In the early stages of the treatment the animals exhibit great sensitiveness and react almost regularly with slight fever after each injection. It is therefore necessary to raise the dose gradually, only ten milligrams at a time; but after the animals have been accustomed to receive fifty milligrams at a single injection without a marked general disturbance of health it is possible to progress more quickly. From fifty milligrams the dose may be raised to seventy-five, then successively to one hundred and one hundred and twenty-five milligrams; but a pause of three or four days is necessary between each injection. Naturally it is impossible to draw hard and fast rules in this case, as each animal possesses an individuality of its own which requires individual attention.

The special treatment can be regarded as completed when for each kilo body weight of the animal two grams of the above-described concentrated preparation, free from glycerine, have been injected. I now proceed to the final treatment after an interval of about four days.

*Final treatment.*—For final treatment I employ a preparation for injection which is preferably produced in the following manner: Bouillon of the composition above described is inoculated with tubercle bacilli under the precautions defined above and allowed to stand in the incubator at 40° centigrade for two weeks. After this period has elapsed the bouillon is boiled for two hours over wire-gauze, brought into an agate mortar, and the whole well triturated. Of this sterilized liquid containing the dead remains of the bacilli seven to ten cubic centimeters is injected into each animal, according to its weight. In consequence of this inoculation local suppuration and abscesses are always formed, but are quickly healed under antiseptic treatment.

The animals having undergone the above three treatments in succession are now kept, preferably, about three or four weeks before drawing blood from them for the purpose of preparing the remedial serum. Then by means of a trocar 0.5 to 0.75 liter of blood is drawn from the jugular vein under aseptic precautions, and after coagulation the serum is poured off, filtered through a Chamberland filter, 0.4 per cent. carbolic acid added, and filled into sterilized bottles. It is then ready for therapeutical employment.

Experiments on animals have proved that this remedial serum prepared as above possesses specific antitoxic properties which cause it to heal light cases of tuberculosis and to stay the progress of severe and advanced cases of the disease.

The serum is characterized by its specific action upon tuberculous toxine, (tuberculin,) whereby it paralyzes or neutralizes the action of tuberculin, and the value of the serum as a therapeutical agent depends upon the degree of paralyzing or neutralizing action it possesses.

The paralyzing or neutralizing action of the serum prepared in accordance with this invention may be demonstrated as follows: If into a guinea pig infected with tuberculosis thirty days previously an injection of a mixture of 0.5 gram tuberculin and three grams serum prepared in accordance with this invention is made, there is no appearance of any febrile reaction, and the animal will live for weeks after, whereas similar animals also infected with tuberculosis thirty days previously will die in a few hours from the injection of 0.5 gram tuberculin either alone or mixed with normal serum or diphtheria antitoxine serum.

What I claim, and desire to secure by Letters Patent, is—

1. The process of manufacturing serum for the cure or retardation of the progress of tuberculosis, which process consists in injecting into a living animal first tuberculin, secondly, tuberculin freed from glycerine, and thirdly a sterilized cultivation of tubercle bacilli containing the dead remains of the bacilli, in then, after an interval of several weeks, drawing blood from the animal, then coagulating it, and in then separating the serum from the blood, substantially as set forth.

2. The process of manufacturing serum for the cure or retardation of the progress of tuberculosis, which process consists in injecting subcutaneously into a living animal and in approximately the quantities hereinbefore stated relatively to the weight of the animal, first tuberculin freed from glycerine, and then a sterilized cultivation of tubercle bacilli containing the dead remains of the bacilli, in then after an interval of several weeks drawing blood from the animal and coagulating this blood, and in then separating the serum from the blood, substantially as set forth.

In witness whereof I have hereunto signed my name in the presence of two subscribing witnesses.

FRANZ NIEMANN.

Witnesses:
RICHARD SCHMIDT,
JOHN TOLLMAN.